(12) United States Patent
Lee

(10) Patent No.: US 12,043,806 B2
(45) Date of Patent: *Jul. 23, 2024

(54) MARINE ENGINE PRETREATMENT DESULFURIZATION CONTROL AND MONITORING SYSTEM

(71) Applicant: LOWCARBON CO., LTD., Jeollanam-do (KR)

(72) Inventor: Cheol Lee, Cheongju-si (KR)

(73) Assignee: LOWCARBON CO., LTD., Jeollanam-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/310,636

(22) PCT Filed: Sep. 17, 2020

(86) PCT No.: PCT/KR2020/012552
§ 371 (c)(1),
(2) Date: Oct. 9, 2022

(87) PCT Pub. No.: WO2021/091078
PCT Pub. Date: May 14, 2021

(65) Prior Publication Data
US 2023/0065265 A1  Mar. 2, 2023

(30) Foreign Application Priority Data
Nov. 5, 2019  (KR) .......................... 10-2019-0139981

(51) Int. Cl.
*C10G 29/16*  (2006.01)
*C10G 29/04*  (2006.01)

(52) U.S. Cl.
CPC ............. *C10G 29/16* (2013.01); *C10G 29/04* (2013.01); *C10G 2300/201* (2013.01); *C10G 2300/4006* (2013.01)

(58) Field of Classification Search
CPC ........ Y02T 10/12; Y02A 50/20; F02M 25/00; C10L 1/04; C10L 1/12; C10L 10/02;
(Continued)

(56) References Cited

U.S. PATENT DOCUMENTS

2007/0101969 A1  5/2007  Lay et al.

FOREIGN PATENT DOCUMENTS

JP  2007-521365 A  8/2007
JP  2013-515905 A  5/2013
(Continued)

OTHER PUBLICATIONS

International Search Report for International application No. PCT/KR2020/012552, Dec. 23, 2020, ISA/KR.

*Primary Examiner* — Vishal V Vasisth
(74) *Attorney, Agent, or Firm* — ArentFox Schiff LLP

(57) ABSTRACT

The present invention includes a fuel injection amount sensor for detecting an injection amount of oil, a pretreatment desulfurization agent injection amount sensor for detecting an injection amount of a pretreatment desulfurization agent, and a control panel for controlling and monitoring the injection amount of the pretreatment desulfurization agent so that the predetermined desulfurization agent is mixed with the fuel in a predetermined mixing ratio. The fuel injection amount sensor is disposed on a fuel supply line between a fuel tank and a marine engine, and the pretreatment desulfurization agent injection amount sensor is disposed between a downstream fuel supply line installed downstream of the fuel injection amount sensor and a pretreatment desulfurization agent tank.

16 Claims, 5 Drawing Sheets

(58) Field of Classification Search
CPC ..... C10L 2200/0231; C10L 2200/0272; C10L 2200/0222; C10L 2200/0446; C10L 2200/0236; C10L 2200/024; C10L 1/1258; C10L 1/1233; C10L 2200/0268; C10L 2270/026; C10L 2200/0209; C10L 2200/0213; C10L 2200/0438; C10L 2290/24; C10L 2200/0218; C10L 2200/029; C10L 1/1208; B01D 53/8609; B01D 53/501; B01D 53/30; B01D 2259/4566; C10G 29/06; C10G 29/16; C10G 27/12; C10G 53/14; C10G 29/02; C10G 53/08; C10G 29/04; C10G 2300/201; C10G 2300/4006
See application file for complete search history.

(56) References Cited

FOREIGN PATENT DOCUMENTS

| | | |
|---|---|---|
| JP | 2016-164071 A | 9/2016 |
| JP | 2018-149842 A | 9/2018 |
| KR | 10-2006-0106331 A | 10/2006 |
| KR | 10-2009-0005852 A | 1/2009 |
| KR | 10-1836047 B1 | 3/2018 |
| KR | 101864999 B1 | 6/2018 |
| KR | 10-1875492 B1 | 7/2018 |

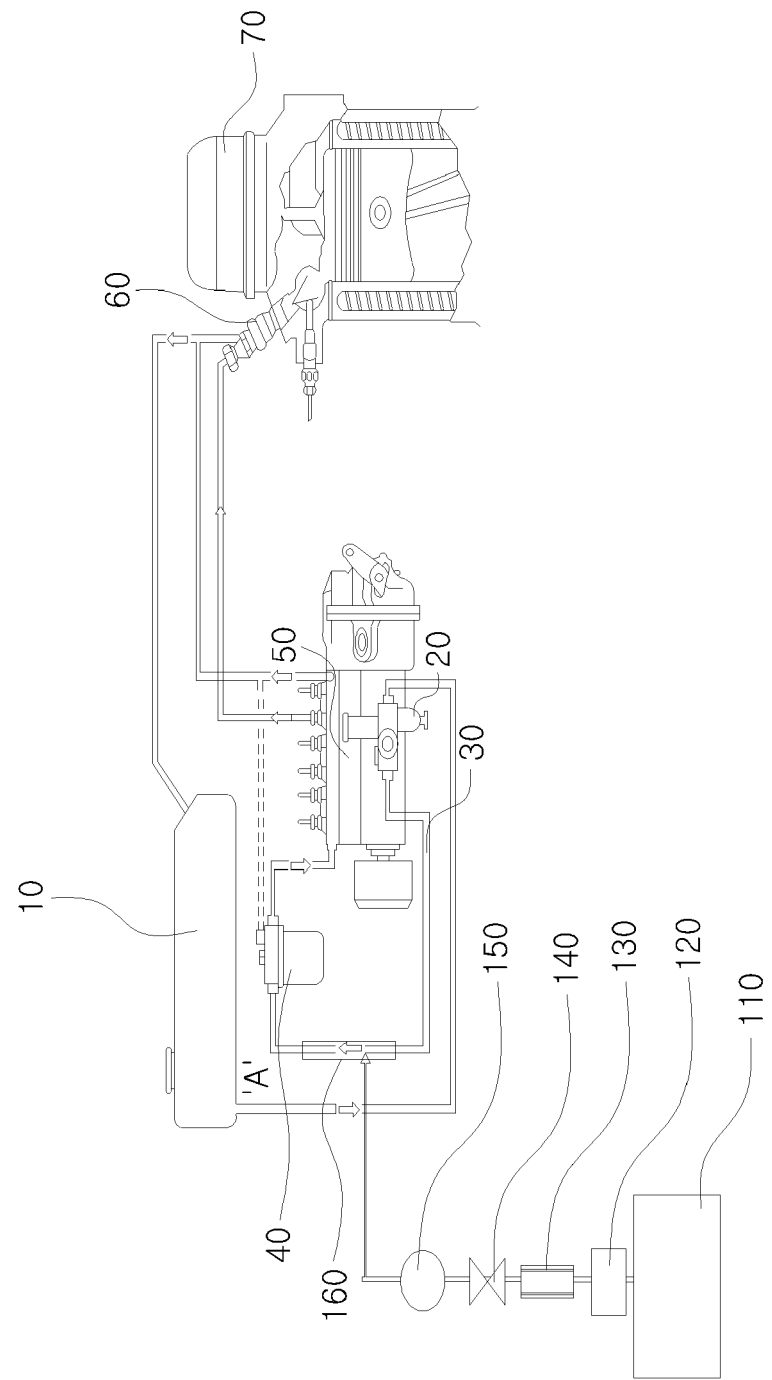
[FIG. 1]

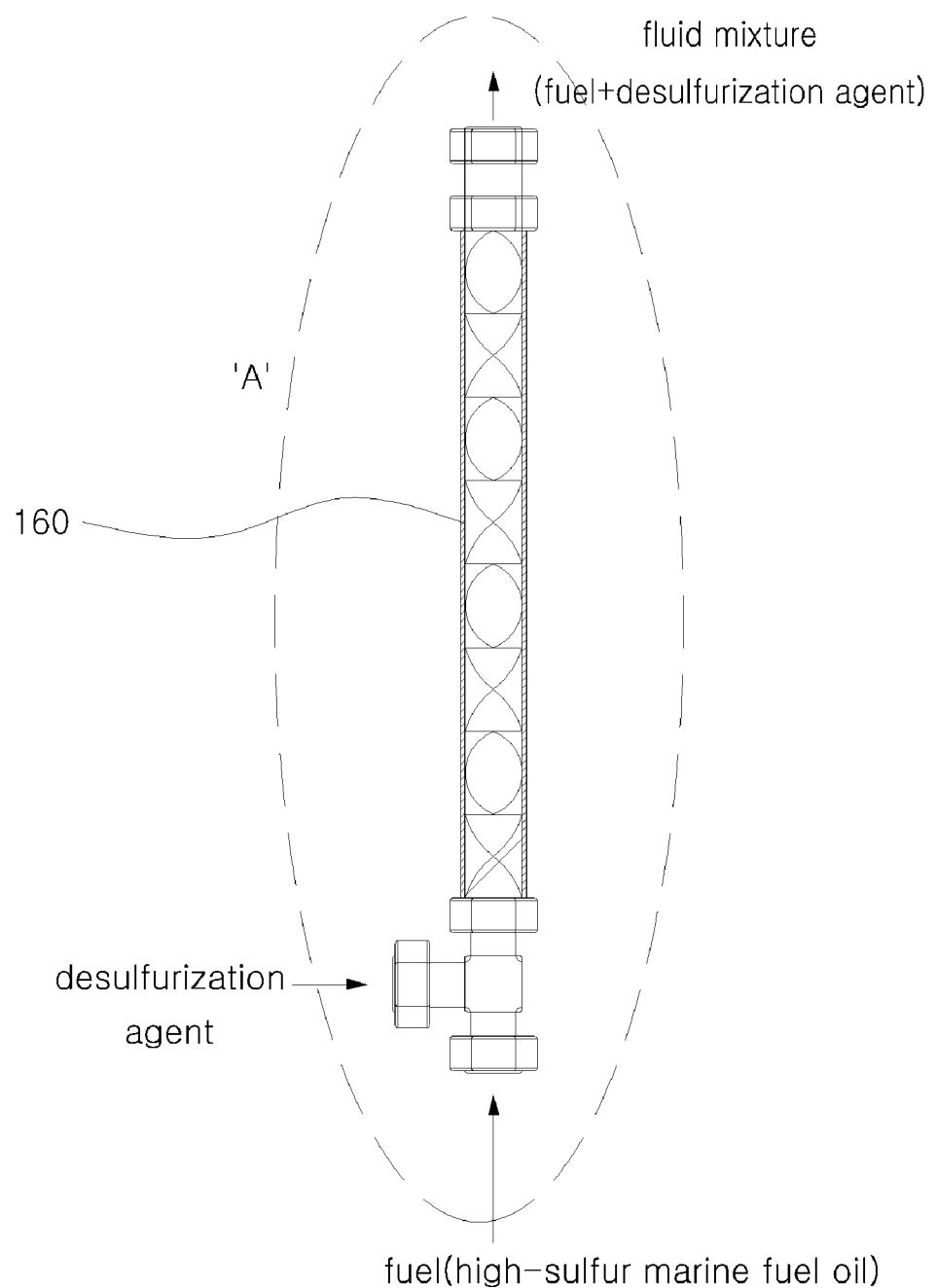
[FIG. 2]

[FIG. 3]
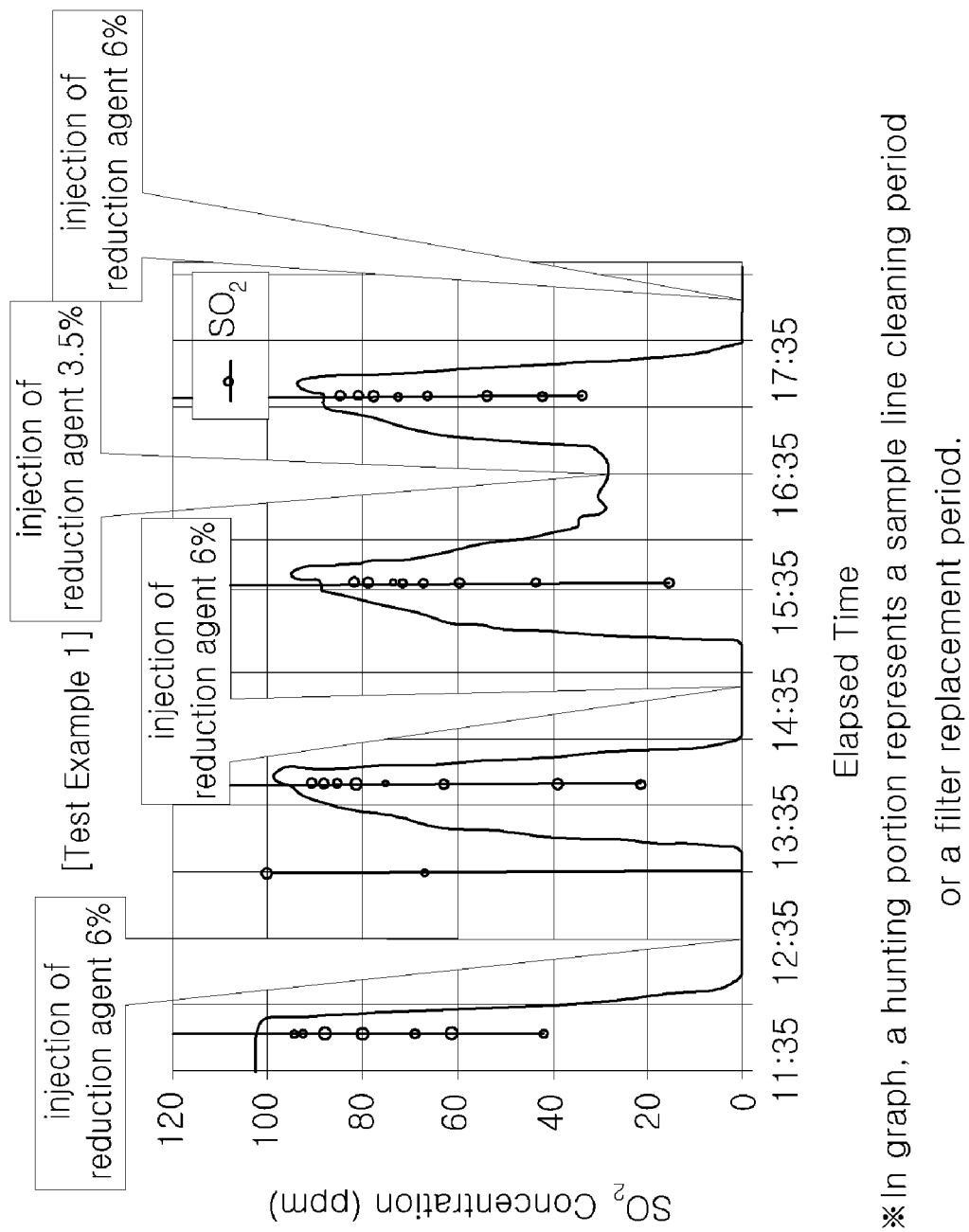

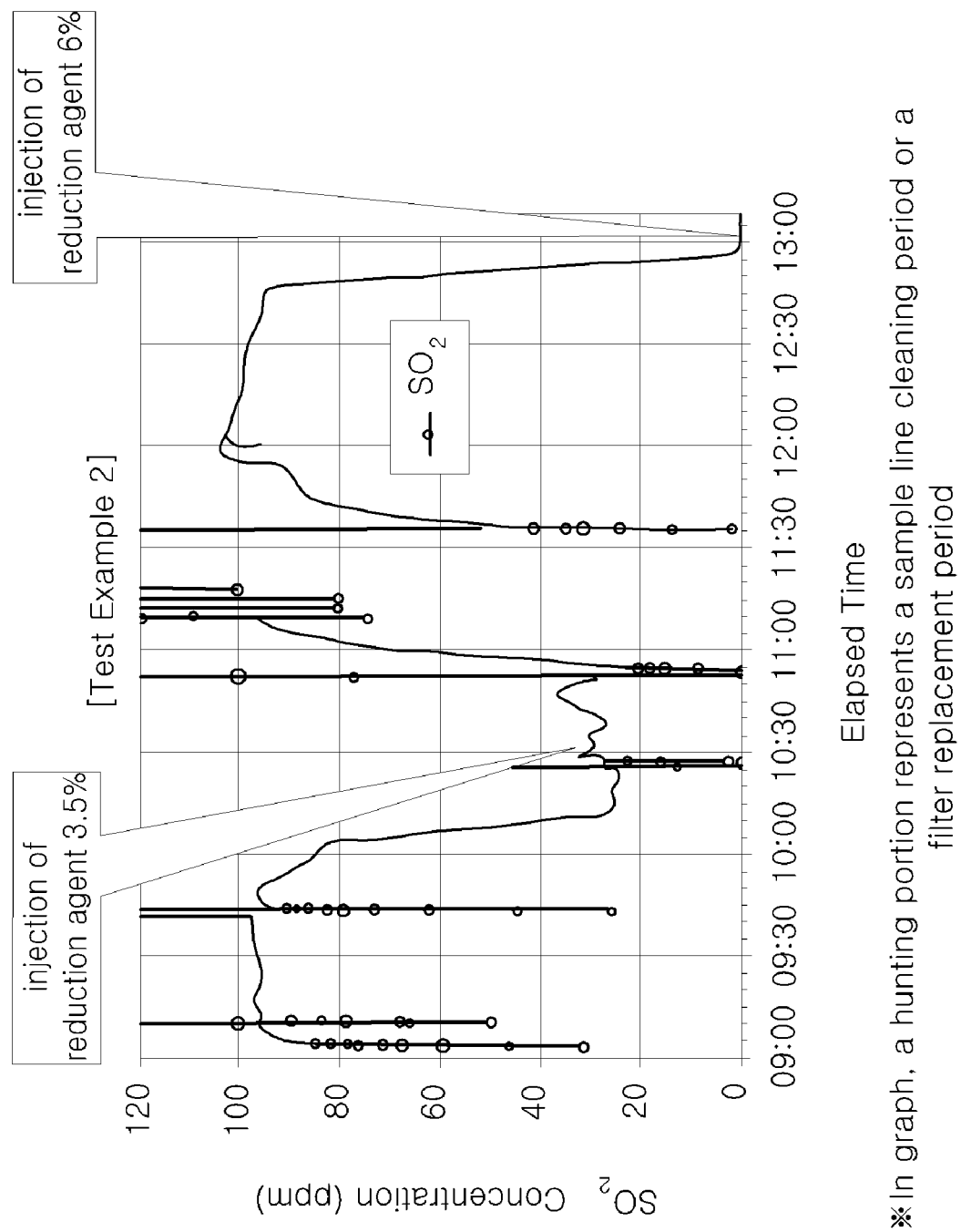

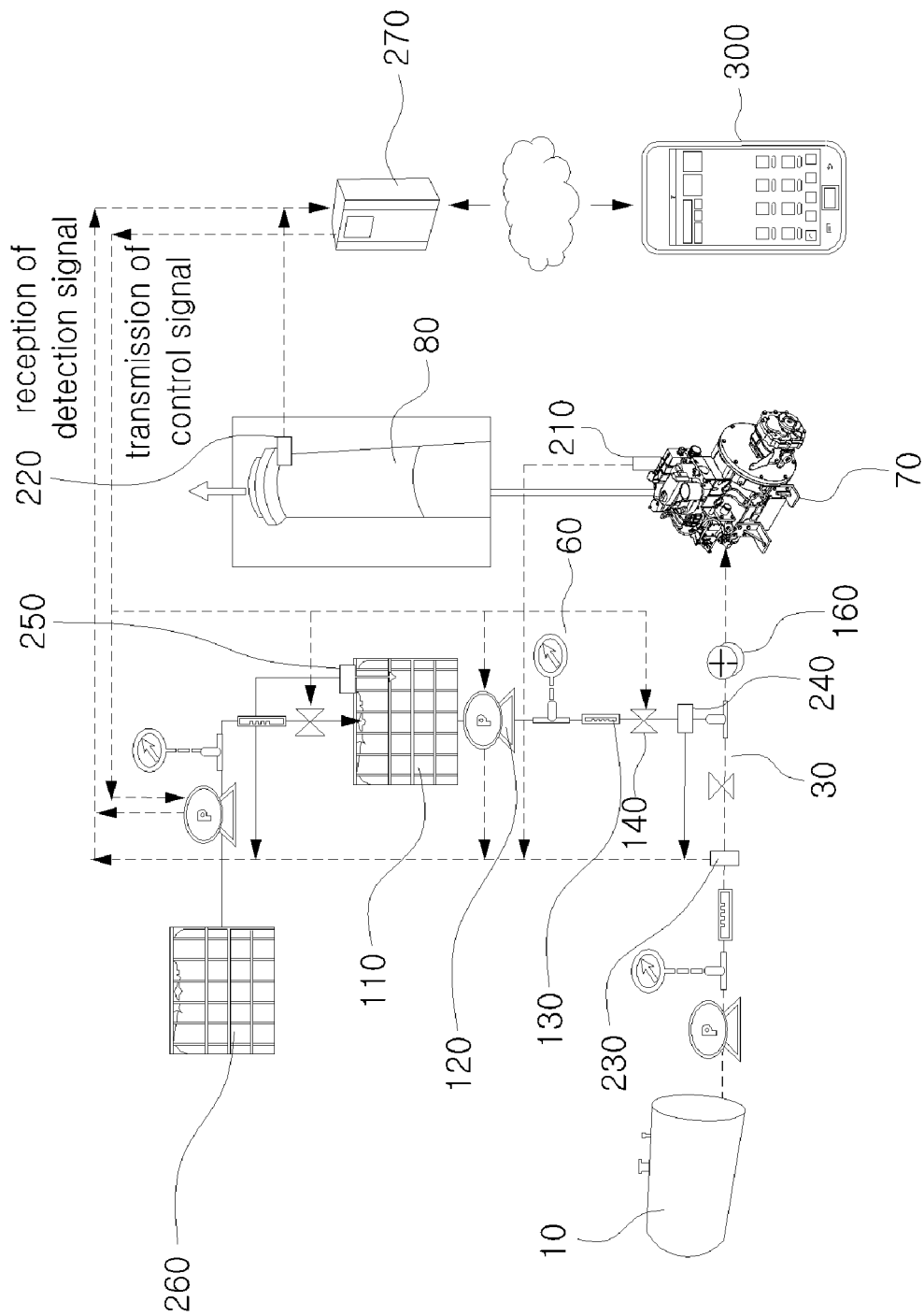
[FIG. 5]

MARINE ENGINE PRETREATMENT DESULFURIZATION CONTROL AND MONITORING SYSTEM

CROSS-REFERENCE TO RELATED APPLICATION

This application is a 371 U.S. national stage of PCT/KR2020/012552, filed Sep. 17, 2020 which claims the benefit of Korean Patent Application No. 10-2019-0139981, filed Nov. 5, 2019, the contents of each of which are incorporated herein by reference.

TECHNICAL FIELD

The present invention relates to a pretreatment desulfurization control and monitoring system for a marine engine. More particularly, the present invention relates to a marine engine pretreatment desulfurization control and monitoring system for performing a pretreatment desulfurization function to reduce emissions of sulfur oxides (SOx) when marine fuel oil such as bunker-C oil is burned in a marine engine.

BACKGROUND ART

Sulfur oxides (SOx) and nitrogen oxides (NOx) are pointed out as pollutants that cause air pollution. Sulfur oxides are contained in industrial flue gas emitted from the combustion of fossil fuels containing sulfur, and the sulfur oxides cause various environmental pollution problems such as acid rain.

Desulfurization technology for removing sulfur oxides from industrial flue gas has been continuously studied, and a flue gas desulfurization method of treating flue gas generated through combustion of fissile fuels has been generally used in factories or power plants.

The flue gas desulfurization method refers to a method of desulfurizing the flue gas after burning a fossil fuel containing sulfur, and the flue gas desulfurization methods are categorized into wet treatment and dry treatment. In the wet treatment, sulfur oxides are removed by washing flue gas with ammonia water, sodium hydroxide solution, lime milk, etc. while in the dry treatment, sulfur oxides are removed by contacting particles or powders of activated carbon or carbonates with flue gas to adsorb or react with sulfur dioxide.

In particular, the sulfur oxide content of heavy fuel oil (MGO, MDO, DDO) such as bunker-C oil used in marine engines is 1,000 to 3,000 times higher than that of automobile fuel. The amount of sulfur oxides emitted by ships around the world is 130 times higher than that of automobiles, and thus is known as the main cause of environmental pollution.

For this reason, conventionally, flue gas desulfurization is performed as a post-treatment process using a marine wet desulfurization system to remove sulfur oxides emitted from marine engines. In the wet desulfurization system, a pump is used to supply washing water (NaOH) supplied to a scrubber through a cooler, and exhaust gas and the washing water come into contact with each other in the scrubber to remove sulfur oxides through post-treatment.

In this case, to maintain a predetermined level of the sulfur oxide removal capability of the wet desulfurization system, the pH of the washing water is monitored to automatically control the supply amount of the washing water. The used washing water is purified to recycle the washing water. This purification process generates a large amount of sludge, and the sludge is collected and stored in a sludge tank, and the sludge is treated after the ship is anchored.

As described above, the conventional post-treatment wet desulfurization technology requires a lot of manpower and cost due to the complicated washing water purification process, and it is necessary to separately construct a separate complex desulfurization facility. Therefore, it is difficult to apply such a conventional desulfurization system to currently operating ships. That is, there is a problem that it is not easy and practical to use the conventional desulfurization system in an existing ship in terms of space and cost.

Therefore, in order to dramatically reduce the environmental pollution caused by the combustion of marine fuel oil and the emission of sulfur oxides, research on an effective pretreatment desulfurization control and monitoring system that can significantly reduce the emission of sulfur oxides, can easily remove sulfur oxides, and can be easily applied to an existing ship is urgently needed.

DISCLOSURE

Technical Problem

The present invention has been made to solve the problems occurring in the related art, and an objective of the present invention is to provide a pretreatment desulfurization control and monitoring system for a marine engine, the system being capable of preventing sulfur oxides generated through the combustion of high-sulfur-content marine fuel oil from being discharged into the air, having a simple structure to be easily applied to an existing ship, and being capable of effectively controlling desulfurization in real time.

Technical Solution

In order to accomplish the objective of the present invention provides, one embodiment of the present invention provides a desulfurization control and monitoring system including: a fuel injection amount sensor installed on a fuel supply line connected between a fuel tank and a marine engine and configured to detect an injection amount of fuel; a pretreatment desulfurization agent injection amount sensor disposed between a pretreatment desulfurization agent tank and a downstream fuel supply line installed downstream of the fuel injection amount sensor and configured to the detect an injection amount of a pretreatment desulfurization agent; and a control panel for controlling and monitoring the injection amount of the pretreatment desulfurization agent, the control panel being connected to the sensors in a bi-directionally communicable manner so that the pretreatment desulfurization agent can be mixed with the fuel in a predetermined mixing ratio.

In addition, according to one embodiment, the system may further include an RPM sensor that is added to the marine engine and detects the number of revolutions per minute (RPM) of the marine engine.

In addition, according to one embodiment, the system may further include a gas sensor that is added to an exhaust port of the marine engine, and which detects the concentration of sulfur oxides contained in an exhaust gas.

In addition, according to one embodiment, the system may further include a water level sensor added to the pretreatment desulfurization agent tank.

In addition, according to one embodiment, reservoir tank having a large-capacity for storing the pretreatment desulfurization agent for replenishment may be further connected to the pretreatment desulfurization agent tank, and the pretreatment desulfurization agent may be automatically replenished from the reservoir tank to the pretreatment desulfurization agent tank when a lower water level than a predetermined water level is detected by the water level sensor.

In addition, according to one embodiment, the control panel may be connected to an administrator's mobile terminal through a wireless communication scheme and may be remotely controlled and monitored through a mobile application.

In addition, according to one embodiment, the pretreatment desulfurization agent may include: (a) at least one oxide selected from the group consisting of $SiO_2$, $Al_2O_3$, $Fe_2O_3$, $TiO_2$, MgO, MnO, CaO, $Na_2O$, $K_2O$, and $P_2O_5$; (b) at least one metal selected from the group consisting of Li, Cr, Co, Ni, Cu, Zn, Ga, Sr, Cd, and Pb; and (c) at least one liquid composition selected from the group consisting of sodium tetraborate ($Na_2B_4O_7 \cdot 10H_2O$), sodium hydroxide (NaOH), sodium silicate ($Na_2SiO_3$), and hydrogen peroxide ($H_2O_2$).

In addition, according to one embodiment, the oxide may include 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$, and 5 to 20 parts by weight of $P_2O_5$. The metal may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

In addition, according to one embodiment, the oxide and metal particles may have a size of 1 to 2 μm, and a specific gravity of 2.5 to 3.0.

In addition, according to one embodiment, the sodium tetraborate ($Na_2B_4O_7 \cdot 10H_2O$) may be contained in an amount of 20 to 130 parts by weight, the sodium hydroxide (NaOH) may be contained in an amount of 15 to 120 parts by weight, the sodium silicate ($Na_2SiO_3$) may be contained in an amount of 50 to 250 parts by weight, and hydrogen peroxide ($H_2O_2$) may be contained in an amount of 10 to 50 parts by weight.

In addition, according to one embodiment, in the pretreatment desulfurization agent, the oxide, the metal, and the liquid composition may form a metal chelate compound.

In addition, according to one embodiment, the sulfur oxide ($SO_x$) adsorption effect of the pretreatment desulfurization agent may be activated at a temperature within a range from 400° C. to 1200° C.

In addition, according to one embodiment, the pretreatment desulfurization agent may be mixed in a ratio from 0.1 to 10 parts by weight relative to 100 parts by weight of the marine fuel oil.

In addition, according to one embodiment, the pretreatment desulfurization agent may be mixed in a ratio of 6 parts by weight relative to 100 parts by weight of the marine fuel oil.

In addition, according to one embodiment, the fuel supply line may be equipped with a line mixer, and the pretreatment desulfurization agent may be injected into the marine fuel oil in a state in which the pretreatment desulfurization agent tank is connected to the line mixer.

In addition, according to one embodiment, the marine fuel oil may be any one of heavy oil such as bunker-A oil, bunker-B oil, or bunker-C oil, or light oil such as MGO, MDO, or DDO.

Advantageous Effects

The pretreatment desulfurization control and monitoring system for a marine engine, of the present invention, can prevent a large amount of sulfur oxides generated in a process of burning high-sulfur-content marine fuel oil from being discharged into the air in real time, thereby greatly contributing to solving the problem of air pollution caused by sulfur oxides.

In addition, the pretreatment desulfurization control and monitoring system of the present invention is different from a conventional method of desulfurizing flue gas after the combustion of fuel. That is, the system mixes a pretreatment desulfurization agent with the fuel before the combustion of the fuel so that the pretreatment desulfurization agent and the fuel are combusted together in the marine engine. Therefore, the system can control and monitor the pretreatment desulfurization process if it is simply connected to a fuel supply system of an existing marine engine without requiring an additional investment for installation of new desulfurization facilities. Therefore, the system can be simply and easily applied to an existing ship and can improve the desulfurization effect in real time.

DESCRIPTION OF DRAWINGS

FIG. 1 is an exemplary view illustrating the construction of a pretreatment desulfurization system according to the present invention;

FIG. 2 is a partially enlarged view illustrating a "A" portion of FIG. 1;

FIG. 3 is a view illustrating the result of analysis of a sulfur oxide ($SO_2$) concentration in the entire session of Test Example 1;

FIG. 4 is a view illustrating the result of analysis of a sulfur oxide ($SO_2$) concentration in the entire session of Test Example 2;

FIG. 5 is an exemplary view showing a configuration in which a pretreatment desulfurization control and monitoring system for a marine engine, of the present invention, is added to the configuration of FIG. 1

BEST MODE

In the following description, the specific structural or functional descriptions for exemplary embodiments according to the concept of the present disclosure are merely for illustrative purposes. Therefore, those skilled in the art will appreciate that various modifications and changes to the exemplary embodiments are possible, without departing from the scope and spirit of the present disclosure. Therefore, the present disclosure is intended to cover not only the exemplary embodiments but also various alternatives, modifications, equivalents, and other embodiments that may be included within the spirit and scope of the embodiments as defined by the appended claims. Hereinafter, embodiments of the present invention will be described in detail in conjunction with the accompanying drawings.

The present invention uses a desulfurization catalyst (hereinafter, referred to as "pretreatment desulfurization agent") including: (a) at least one oxide selected from the group consisting of $SiO_2$, $Al_2O_3$, $Fe_2O_3$, $TiO_2$, MgO, MnO, CaO, Na$_2$O, K$_2$O, and P$_2$O$_5$; (b) at least one metal selected from the group consisting of Li, Cr, Co, Ni, Cu, Zn, Ga, Sr, Cd, and Pb; and (c) at least one liquid composition selected from the group consisting of sodium tetraborate (Na$_2$B$_4$O$_7$·10H$_2$O), sodium hydroxide (NaOH), sodium silicate (Na$_2$SiO$_3$), and hydrogen peroxide (H$_2$O$_2$).

The pretreatment desulfurization agent according to the present invention preferably includes at least one oxide selected from the group consisting of SiO$_2$, Al$_2$O$_3$, Fe$_2$O$_3$, TiO$_2$, MgO, MnO, CaO, Na$_2$O, K$_2$O, and P$_2$O$_5$. Preferably, the pretreatment desulfurization agent includes all the oxides selected from the group consisting of SiO$_2$, Al$_2$O$_3$, Fe$_2$O$_3$, TiO$_2$, MgO, MnO, CaO, Na$_2$O, K$_2$O, and P$_2$O$_5$ as in Examples described below.

When including all of SiO$_2$, Al$_2$O$_3$, Fe$_2$O$_3$, TiO$_2$, MgO, MnO, CaO, Na$_2$O, K$_2$O, and P$_2$O$_5$, the basic formula is K$_{0.8-0.9}$(Al, Fe, Mg)$_2$(Si, Al)$_4$O$_{10}$(OH)$_2$ which is a mineral commonly called illite. The illite has a 2:1 structure in which one octahedral layer is bonded between two tetrahedral layers. The octahedral layer has a dioctahedral structure in which only 2 cation sites out of 3 cation sites in the bonding structure are filled with cations. Due to the lack of positive ions, the illite has an overall negative charge (−). For this reason, sulfur oxides (SO$_x$) can be adsorbed when the mixture of a combustible material and the desulfurization catalyst is burned.

As the oxides, the pretreatment desulfurization agent my include 15 to 90 parts by weight of SiO$_2$, 15 to 100 parts by weight of Al$_2$O$_3$, 10 to 50 parts by weight of Fe$_2$O$_3$, 5 to 15 parts by weight of TiO$_2$, 20 to 150 parts by weight of MgO, 10 to 20 parts by weight of MnO, and 20 to 50 parts by weight of CaO, 15 to 45 parts by weight of Na$_2$O, 20 to 50 parts by weight of K$_2$O, and 5 to 20 parts by weight of P$_2$O$_5$.

In addition, the oxides may be mixed and pulverized into fine particles having a particle size of 1 to 2 μm by a pulverizer before being prepared as the desulfurization catalyst. The oxides may have a specific gravity of 2.5 to 3.0 and may be in the form of powder that is streak-colored or silvery white.

The pretreatment desulfurization agent according to the present invention may include one or more metals selected from the group consisting of Li, Cr, Co, Ni, Cu, Zn, Ga, Sr, Cd, and Pb. As in one embodiment, all the metals including Li, Cr, Co, Ni, Cu, Zn, Ga, Sr, Cd, and Pb are preferably included.

As the metals, the pretreatment desulfurization agent may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

In addition, the metals, like the oxides, may be mixed and pulverized into fine particles having a particle size of 1 to 2 μm by a pulverizer, the metals may have a specific gravity of 2.5 to 3.0, and the metals may be in the form of powder that is streak-colored and silvery white.

The pretreatment desulfurization agent according to the present invention may include at least one liquid composition selected from the group consisting of sodium tetraborate (Na$_2$B$_4$O$_7$·10H$_2$O), sodium hydroxide (NaOH), sodium silicate (Na$_2$SiO$_3$), and hydrogen peroxide (H$_2$O$_2$). Preferably, as in one embodiment, all the liquid compositions including sodium tetraborate, sodium hydroxide, sodium silicate, and hydrogen peroxide may be included.

The pretreatment desulfurization agent according to the present invention forms a metal chelate compound through coordination with the metals because the oxides and the liquid compositions are mixed and reacted to serve as a chelating agent.

In addition, the liquid composition may be adsorbed on ash generated when a combustible material so that the liquid composition may react with sulfur oxides in the ash to remove the sulfur oxides. Sodium metaborate (NaBO$_2$) is derived from the sodium tetraborate (Na$_2$B$_4$O$_7$), NaBH$_4$ is produced through hydrogenation, and the produced NaBH$_4$ reacts with oxygen and sulfur oxides to foim sodium sulfate (Na$_2$SO$_4$). Thus, the sulfur oxides are removed. The reactions are represented by Reaction Formulas 1 and 2 below.

NaBH$_4$+O$_2$→Na$_2$O$_2$+H$_2$O+B [Reaction Formula 1]

1)Na$_2$O$_2$+SO$_3$→Na$_2$SO$_4$+O

2)Na$_2$O$_2$+SO$_2$→Na$_2$SO$_4$

3)Na$_2$O$_2$+SO→Na$_2$SO$_3$ [Reaction Formula 2]

In addition, as the liquid compositions, the sodium tetraborate, the sodium hydroxide, the sodium silicate, and the hydrogen peroxide may be included in amounts of 20 to 130 parts by weight, 15 to 120 parts by weight, 50 to 250 parts by weight, and 10 to 50 parts by weight, respectively in the pretreatment desulfurization agent.

When the pretreatment desulfurization agent in accordance with the present invention is mixed with a combustible material and combusted together in a temperature range from 400° C. to 1200° C., the adsorption effect of sulfur oxides can be activated. However, when the mixture is combusted in a temperature range from 600° C. to 900° C., high efficiency can be obtained.

Hereinafter, a method of preparing the pretreatment desulfurization agent according to the present invention will be described.

The pretreatment desulfurization agent according to the present invention is prepared to include: (a) at least one oxide selected from the group consisting of SiO$_2$, Al$_2$O$_3$, Fe$_2$O$_3$, TiO$_2$, MgO, MnO, CaO, Na$_2$O, K$_2$O, and P$_2$O$_5$; (b) at least one metal selected from the group consisting of Li, Cr, Co, Ni, Cu, Zn, Ga, Sr, Cd, and Pb; and (c) at least one liquid composition selected from the group consisting of sodium tetraborate (Na$_2$B$_4$O$_7$·10H$_2$O), sodium hydroxide (NaOH), sodium silicate (Na$_2$SiO$_3$), and hydrogen peroxide (H$_2$O$_2$).

In step (a), a powder including at least one oxide selected from the group consisting of SiO$_2$, Al$_2$O$_3$, Fe$_2$O$_3$, TiO$_2$, MgO, MnO, CaO, Na$_2$O, K$_2$O, and P$_2$O$_5$ is mixed and finely ground by a fine pulverizer.

In this step, the oxide power includes 15 to 90 parts by weight of SiO$_2$, 15 to 100 parts by weight of Al$_2$O$_3$, 10 to 50 parts by weight of Fe$_2$O$_3$, 5 to 15 parts by weight of TiO$_2$, 20 to 150 parts by weight of MgO, 10 to 20 parts by weight of MnO, and 20 to 50 parts by weight of CaO, 15 to 45 parts by weight of Na$_2$O, 20 to 50 parts by weight of K$_2$O, and 5 to 20 parts by weight of P$_2$O$_5$.

In addition, the finely ground oxide powder may be further pulverized repeatedly so that the particle size of the powder is in a range from 1 to 2 μm.

In step (b), one or more metal powders selected from the group consisting of Li, Cr, Co, Ni, Cu, Zn, Ga, Sr, Cd and Pb are mixed and pulverized by a fine pulverizer.

The metal powder may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

In addition, the finely ground metal powder may be ground repeatedly so that the particle size of the powder is in a range from 1 to 2 μm.

In step (c), at least one liquid composition selected from the group consisting of sodium tetraborate ($Na_2B_4O_7 \cdot 10H_2O$), sodium hydroxide (NaOH), sodium silicate ($Na_2SiO_3$), and hydrogen peroxide ($H_2O_2$) is mixed with the finely ground oxide powder and the finely ground metal powder prepared in step (a) and step (b) to prepare a desulfurization catalyst.

In this step, the sodium tetraborate ($Na_2B_4O_7 \cdot 10H_2O$) may be contained in an amount of 20 to 130 parts by weight, the sodium hydroxide (NaOH) may be contained in an amount of 15 to 120 parts by weight, the sodium silicate ($Na_2SiO_3$) may be contained in an amount of 50 to 250 parts by weight, and hydrogen peroxide ($H_2O_2$) may be contained in an amount of 10 to 50 parts by weight.

In addition, in this step, when mixing and reacting with the mixed and finely ground oxide and metal powders prepared in steps (a) and (b), the oxide powder and the liquid composition act as a chelating agent so that a metal chelate compound can be formed.

In addition, the pretreatment desulfurization agent formed in this step is stabilized by sedimentation for 24 to 72 hours, and the sedimented pretreatment desulfurization agent is separated and dried naturally to be used as a powder catalyst for desulfurization. The liquid composition remaining after the sedimented desulfurization agent is separated may be used as a liquid catalyst for desulfurization.

In addition, in the desulfurization method using the pretreatment desulfurization agent according to the present invention, the desulfurization function may be activated when it is mixed and combusted with a combustible material.

A conventional desulfurization method removes sulfur oxides ($SO_x$) from flue gas generated during combustion of a combustible material. The conventional method requires a desulfurization facility for performing the desulfurization process which increases manpower requirements and cost for operating the desulfurization facility. However, since the desulfurization method of the present invention burns the pretreatment desulfurization agent along with the combustible material, the pretreatment desulfurization agent removes sulfur oxides through adsorption during the combustion, thereby reducing the content of sulfur oxides in flue gas. In this way, the method of the present invention exhibits a desulfurization effect.

In addition, the combustible material to which the pretreatment desulfurization agent in accordance with the present invention can be applied may be a combustible material that generates heat through combustion. Examples of the combustible material include coal, petroleum, waste, and biogas.

In addition, as described above, the pretreatment desulfurization agent is separated into a powder catalyst for desulfurization and a liquid catalyst for desulfurization. Each of the powder catalyst and the liquid catalyst is used alone or in combination with the other, depending on the contents of C, H, N, and S of the combustible material. Therefore, the pretreatment desulfurization agent of the present invention can exhibit an excellent desulfurization effect in a simple and easy way of use.

Hereinafter, the configuration of a pretreatment desulfurization system according to one embodiment of the present invention, which is to be applied to a marine engine, will be described in detail with reference to FIG. 1.

The pretreatment desulfurization system in accordance with the present invention is connected to a fuel supply line 30 of a marine engine 70 to supply the pretreatment desulfurization agent (liquid catalyst for desulfurization) in a certain mixing ratio with respect to fuel.

Usually, as the fuel of the marine engine 70, marine fuel oil, for example, heavy oil such as bunker-A oil, bunker-B oil, and bunker-C oil or light oil such as MGO, MDO, or DDO is used. Among them, bunker-C oil has a high sulfur content and generates a large amount of sulfur oxide during combustion. Therefore, the use of bunker-C oil with high sulfur content is regulated due to air pollution.

In FIG. 1, reference numerals 10, 20, 30, 40, 50, and 60 denote a fuel tank, a fuel supply pump, a fuel supply line, a fuel filter, an injection pump, and an injection nozzle, respectively. A detailed description of the components will be omitted.

To this end, the pretreatment desulfurization system in accordance with the present invention is equipped with a pretreatment desulfurization agent tank 110 having a predetermined volume for storing the pretreatment desulfurization agent, and one end of the pretreatment desulfurization agent tank 110 is connected to a metering pump 130 for quantitatively supplying the pretreatment desulfurization agent.

In addition, a flow meter 130 for checking the input flow rate of the pretreatment desulfurization agent, a check valve 140 for adjusting the input flow rate, and a pressure gauge 150 are installed on the fuel supply line 30 between the metering pump 130 and the marine engine 70. Therefore, it is possible to continuously check the fuel supply amount to the marine engine 70 and regulate the supply of the pretreatment desulfurization agent so that the pretreatment desulfurization agent is supplied in a predetermined ratio with respect to the fuel supply amount.

The pretreatment desulfurization agent is preferably supplied and mixed in an amount of 0.1% to 10% by weight relative to 100% by weight of the marine fuel oil.

Referring to FIG. 2, the pretreatment desulfurization agent tank is connected to a line mixer 160 provided on the fuel supply line 30 for supplying the marine fuel oil, and the pretreatment desulfurization agent injected from one side and the marine fuel oil are sufficiently mixed in the line mixer 160 (this process is called line mixing). The sufficiently mixed fluid mixture of the marine fuel oil and the pretreatment desulfurization agent is supplied to the marine engine.

Thereafter, the fluid mixture is combusted in the marine engine. Therefore, sulfur oxides generated during a combustion process are adsorbed and removed by the pretreatment desulfurization agent before being discharged to the outside.

Through this process, even when high-sulfur marine fuel oil such as bunker-C oil is used as fuel, since sulfur oxides are almost perfectly removed during the combustion, it is possible to solve the air pollution problem caused by sulfur oxides.

Hereinafter, the present invention will be described in more detail with reference to Examples and Test Examples.

Examples and Test Examples presented herein are only for illustrative purposes and are not intended to limit the scope of the present invention.

<Example> Preparation of Pretreatment Desulfurization Agent

As oxides, $SiO_2$ 150 kg, $Al_2O_3$ 150 kg, $Fe_2O_3$ 100 kg, $TiO_2$ 50 kg, MgO 200 kg, MnO 100 kg, CaO 200 kg, $Na_2O$ 150 kg, $K_2O$ 200 kg, and $P_2O_3$ 50 kg were mixed and finely ground to form fine oxide powder.

As metals, Li 35 g, Cr 50 g, Co 10 g, Ni 60 g, Cu 180 g, Zn 350 g, Ga 400 g, Sr 200 g, Cd 20 g, and Pb 30 g were mixed and finely ground to form fine metal powder.

The fine oxide powder and the fine metal powder are repeatedly ground to have a particle size of 1 to 2 µm.

3000 kg of water was put into a reactor, the water was maintained at a temperature of 50° C. to 60° C., and 50 kg of sodium tetraborate ($Na_2B_4O_7 \cdot 10H_2O$) was added thereto. After stirring for 30 minutes, 100 kg of sodium hydroxide (NaOH) was added and stirred. Next, after 10 minutes, the fine oxide powder was added in units of 100 kg at intervals of 5 minutes and stirred for 2 hours or more. While stirring, the temperature was raised to 60° C. to 80° C., and 100 kg of sodium silicate ($Na_2SiO_3$) was added. After stirring for 30 minutes, the fine metal powder was added in units of 20 g at intervals of 3 minutes and stirred. After stirring for 1 hour, 30 kg of hydrogen peroxide ($H_2O_2$) was added, stirred for another 30 minutes, and then naturally cooled for 1 hour.

After cooling and stabilizing for 48 hours, the liquid composition and the sedimented powder composition are separated from each other.

The sedimented powder composition was dried naturally and named as a powder catalyst for desulfurization (GTS-P).

In addition, the liquid composition remaining after the sedimented powder composition was removed and moved to a separate container, which is named as a liquid catalyst for desulfurization (GTS-W).

<Test Example 1> Test for Checking Reduction in Sulfur Oxide in Marine Engine Exhaust Gas (1) Test Condition In order to evaluate the desulfurization efficiency of the pretreatment desulfurization agent (liquid catalyst for desulfurization) prepared as described above, 3.5% and 6.0% by weight of the pretreatment desulfurization agent was supplied to a fuel supply line connected to a marine engine to be mixed with 100% by weight of fuel and burned. Next, a sulfur oxide reduction performance test was conducted to analyze and compare the concentration of sulfur oxides in exhaust gas.

The specifications of the marine engine used for the test are shown in Table 1 below.

TABLE 1

Specifications of engine for test

| Maker | Yanmar |
|---|---|
| Model | 4LOD |
| Horsepower (Hp) | 200 |
| Number of Cylinders | 4 in-line |
| Combustion system | Direct injection |
| Aspiration | Natural aspirated |
| Dimensions (L × W × H, mm) | 500 × 1550 × 1400 |
| Cooling system | Direct water cooling |
| Marine gear | Mechanical |
| Fuel consumption rate | 100 mL/min |

Fuel used: Bunker-C oil
Operating conditions: no-load operation

Supply amount and method of pretreatment desulfurization agent: an amount of 3.5% by weight of the pretreatment desulfurization agent was supplied to the fuel supply line with a metering pump with respect to the fuel flow rate, and then and an amount of 6.0% by weight of the pretreatment desulfurization agent was supplied.

Exhaust gas analysis equipment: Germany VarioPlus Ind. MRU Emission Monitoring System Exhaust gas analysis method: exhaust gas was sampled from an exhaust pipe connected to the engine and with an analysis equipment (standard oxygen concentration of 17%)

Since the oxygen concentration in the exhaust gas was maintained at 17% to 18% in the engine no-load operation condition, the reference oxygen concentration was set to 17% to prevent an excessive difference between the measured concentration and the corrected concentration that is based on the reference oxygen concentration.

(2) Test Method and Procedures
1) Operate engine and maintain a normal state
2) Preheat exhaust gas analysis equipment and perform zero setting
3) Perform measurement in a condition in which no pretreatment desulfurization agent was injected (30 minutes)
4) Perform measurement in a condition in which 6.0% by weight of pretreatment desulfurization agent was injected (1 hour)
5) Repeat step 3) and step 4) once
6) Perform measurement in a condition in which no pretreatment desulfurization agent was injected (30 minutes)
7) Perform measurement in a condition in which 3.5% by weight of pretreatment desulfurization agent was injected (1 hour)
8) Perform measurement in a condition in which no pretreatment desulfurization agent was injected (30 minutes)
9) Perform measurement in a condition in which 6.0% by weight of pretreatment desulfurization agent was injected (1 hour)
10) Saving data and stop testing

TABLE 2

Test Condition

| Time | Test condition |
|---|---|
| 11:21-11.54 | Fuel oil |
| 11:54-13:20 | Pretreatment desulfurization agent 6.0% by weight |
| 13:20-14:03 | Fuel oil |
| 14:03-15:06 | Pretreatment desulfurization agent 6.0% by weight |
| 15:06-15:46 | Fuel oil |
| 15:46-16:46 | Pretreatment desulfurization agent 3.5% by weight |
| 16:46-17:23 | Fuel oil |
| 17:23-18:25 | Pretreatment desulfurization agent 6.0% by weight |

(3) Result of Analysis of Sulfur Oxide ($SO_2$) Concentration (in Terms of 17% Reference Oxygen Concentration)

FIG. 3 shows the analysis results of sulfur oxide ($SO_2$) concentration for the entire session of Test Example 1 performed according to the test conditions, methods, and procedures described above, and Table 3 shows concentration variation of $SO_2$ in each measurement session of FIG. 3 are summarized. (in terms of 17% of reference oxygen concentration)

TABLE 3

$SO_2$ concentration for measurement session (in terms of 17% of reference oxygen concentration)

| Measurement time | Test condition | $SO_2$ concentration (ppm) | Note |
|---|---|---|---|
| 11:35-12:00 | Fuel oil | 102.00 | Average value |
| 12:23-13:00 | Pretreatment desulfurization agent 6.0% by weight | 0.01 | Average value |
| 14:08 | Fuel oil | 100.0 | Peak value |
| 14:26-15:15 | Pretreatment desulfurization agent 6.0% by weight | 0.00 | Average value |
| 15:51 | Fuel oil | 95.2 | Peak value |
| 16:22-16:52 | Pretreatment desulfurization agent 3.5% by weight | 29.19 | Average value |
| 17:28 | Fuel oil | 94.5 | Peak value |
| 17:50-18:25 | Pretreatment desulfurization agent 6.0% by weight | 0.00 | Average value |

Referring to FIG. 3 and Table 3, after 6.0% by weight and 3.5% by weight of the pretreatment desulfurization agent relative to 100% by weight of the fuel oil were sequentially injected into the fuel supply line, the concentration of $SO_2$ was measured for each case. That is, the test was performed with four measurement sessions.

In a first measurement session, when only fuel oil was burned (measurement time: 11:35-12:00), the concentration of $SO_2$ in the exhaust gas was 102.00 ppm, but when 6.0% by weight of the pretreatment desulfurization agent was input (measurement time: 12:23-13:00), the concentration of $SO_2$ reduced to 0.01 ppm.

In a second measurement session, when only fuel oil was burned (measurement time: 18:08), the concentration of $SO_2$ in the exhaust gas was 100.00 ppm, but when 6.0% by weight of the pretreatment desulfurization agent was added relative to 100% by weight of fuel oil (measurement time: 4:26-15:15), the concentration of $SO_2$ reduced to 0.00 ppm.

In a third measurement session, when only fuel oil was burned (measurement time 15:51), the concentration of $SO_2$ in the exhaust gas was 95.2 ppm, but when 3.5% by weight of the pretreatment desulfurization agent was added relative to 100% by weight of fuel oil (measurement time 16:22-16:52), the concentration of $SO_2$ reduced to 29.19 ppm.

In a fourth measurement session, when only fuel oil was burned (measurement time 17:28), the concentration of $SO_2$ in the exhaust gas was 94.5 ppm, but when 6.0% by weight of the pretreatment desulfurization agent was added relative to 100% by weight of fuel oil (measurement time 17:50-18:25), the concentration of $SO_2$ reduced to 0.00 ppm.

The measurement results show that the $SO_2$ emissions are reduced when the mixing ratio of the pretreatment desulfurization agent is increased from 3.5% by weight to 6.0% by weight.

<Test Example 2> Test for Checking Reduction in Sulfur Oxide in Marine Engine Exhaust Gas (1) Test Condition
The same as in Text Example 1
(2) Test Method and Procedures
The same as in Text Example 1

TABLE 4

Test Condition

| Time | Test condition |
|---|---|
| 09:06-09:44 | Fuel oil |
| 09:44-10:54 | Pretreatment desulfurization agent 3.5% by weight |
| 10:54-11:10 | Fuel oil |
| 11:10-11:37 | Engine stop |
| 11:37-13:02 | Fuel oil |
| 12:02-13:08 | Pretreatment desulfurization agent 6.0% by weight |

(3) Result of Analysis of Sulfur Oxide ($SO_2$) Concentration (in Terms of 17% Reference Oxygen Concentration)

FIG. 4 shows the analysis results of the sulfur oxide ($SO_2$) concentration for the entire session of Test Example 2 performed according to the test conditions, methods, and procedures described above, and Table 5 shows concentration variation of $SO_2$ in each measurement session of FIG. 3 are summarized. (In terms of a reference oxygen concentration of 17%)

TABLE 5

$SO_2$ concentration for each measurement session (in terms of the reference oxygen concentration of 17%)

| Measurement time | Test condition | $SO_2$ concentration (ppm) | Note |
|---|---|---|---|
| 09:12-09:40 | Fuel oil | 96.43 | Average value |
| 10:18-10:51 | Pretreatment desulfurization agent 3.5% by weight | 29.54 | Average value |
| 11:55-12:44 | Fuel oil | 98.93 | Average value |
| 12:57-13:06 | Pretreatment desulfurization agent 6.0% by weight | 0.00 | Average value |

Referring to FIG. 4 and Table 5, after 6.0% by weight and 3.5% by weight of the pretreatment desulfurization agent relative to 100% by weight of the fuel oil were injected into the fuel supply line, the concentration of $SO_2$ was measured for each case. That is, the test was performed with four measurement sessions.

In a first measurement session, when only fuel oil was burned (measurement time: 09:12-09:40), the concentration of $SO_2$ in the exhaust gas was 96.43 ppm, but when 6.0% by weight of the pretreatment desulfurization agent was input (measurement time: 10:18-10:51), the concentration of $SO_2$ reduced to 29.54 ppm.

In a second measurement session, when only fuel oil was burned (measurement time: 11:55-12:44), the concentration of $SO_2$ in the exhaust gas was 98.93 ppm, but when 6.0% by weight of the pretreatment desulfurization agent was input (measurement time: 12:57-13:06), the concentration of $SO_2$ reduced to 0.00 ppm.

The measurement results show that the $SO_2$ emissions are reduced when the mixing ratio of the pretreatment desulfurization agent is increased from 3.5% by weight to 6.0% by weight.

As can be seen from the results of Test Examples 1 and 2, when fuel and the pretreatment desulfurization agent were burned together, the $SO_2$ concentration in the exhaust gas was reduced by at least 69% and by 100% at a maximum compared to the case where only fuel is burned. In addition, when the pretreatment desulfurization agent increased from 3.5% by weight to 6.0% by weight, the reduction in the $SO_2$ emission increased.

FIG. 5 is an exemplary view showing a configuration in which the pretreatment desulfurization control and monitoring system for a marine engine, of the present invention, is added to the configuration of FIG. 1.

Looking at the configuration of the present invention with reference to FIG. 5, the present invention has a configuration in which multiple sensors 210, 220, 230, 240, 250 and a control panel 270 are added to the pretreatment desulfurization system of FIG. 1.

The multiple sensors include: an RPM sensor 210 added to the marine engine 70 to detect the number of revolutions per minute (RPM) of the marine engine 70; a gas sensor 220 added to an exhaust port 80 of the marine engine 70 to detect the concentration of sulfur oxides contained in an exhaust gas; a fuel injection amount sensor 230 installed on a fuel supply line 30 between a fuel tank 10 and the marine engine 70 to detect an injection amount of fuel; a pretreatment desulfurization agent amount sensor 240 installed between a downstream supply pipe 30 installed downstream of the fuel injection amount sensor 230 and a pretreatment desulfurization agent tank 110 to detect an injection amount of a pretreatment desulfurization agent mixed with the fuel; and a water level sensor 250 added to the pretreatment desulfurization agent tank 110.

In addition, the pretreatment desulfurization agent tank 110 is connected to a separately provided large-capacity reservoir tank 260. When the water level sensor 250 detects a lower water level than a predetermined level, the pretreatment desulfurization agent is automatically replenished from the reservoir tank 260.

Pumps, flow meters, check valves, pressure gauges (not denoted by reference numerals), etc. may be appropriately installed between each of the reservoir tank 260, the pretreatment desulfurization agent tank 110, the fuel tank 10, and the fuel supply line 30 of the marine engine 70. A detailed description of the components will be omitted.

In addition, the control panel 270 is connected to am administrator's mobile terminal 300 by a wireless communication scheme so that the administrator can remotely control and monitor the operation of the system of the present invention in real time using a mobile application (hereinafter referred to as "management app").

On the other hand, looking at the operating relationship between the components of the system having the configuration described above, when fuel is injected into the marine engine 70 from the fuel tank 10, the marine engine 70 is driven to operate. Since the fuel injection amount sensor 230 is installed on the fuel supply line 30 between the fuel tank 10 and the marine engine 70, the control panel 270 receives information on the fuel injection amount from the fuel injection amount sensor 230.

When the fuel injection amount is detected, the pretreatment desulfurization agent is mixed with the fuel in a predetermined mixing ratio relative to the fuel injection amount. The predetermined ratio may be within a range from 0.1% to 10% by weight compared to 100% by weight of the fuel as described above.

Then, when the mixture of the fuel and the pretreatment desulfurization agent is supplied to the marine engine 70, the marine engine 70 is driven while the mixture is burned. Since the marine engine 70 is equipped with the RPM sensor 210, the control panel 270 continuously receives information on the RPM of the marine engine 70 from the RPM sensor 210. Since the gas sensor 220 is installed in the exhaust port of the marine engine 70, the concentration of sulfur oxides in the exhaust gas can be detected in real time.

When a change (increase or decrease) in the RPM is detected by the RPM sensor 210, or a change (increase or decrease) in the concentration of sulfur oxides is detected by the gas sensor 220, the control panel 270 increases or decreases the mixing ratio of the pretreatment desulfurization agent to prevent an increase in the concentration of sulfur oxides in the exhaust gas.

For example, the RPM of the marine engine 70 is increased or decreased, or the concentration of sulfur oxides in the exhaust gas is increased or decreased in a state in which the pretreatment desulfurization agent is supplied in a ratio of 6% by weight with respect to 100% by weight of the initial fuel, the injection amount of the pretreatment desulfurization agent is increased or decreased so that the mixing ratio of the pretreatment desulfurization agent with respect to the injection amount of the fuel is maintained at 6% by weight.

It is preferable that the control of increasing or decreasing the mixing ratio of the pretreatment desulfurization agent is automatically performed according to a control value preset in the control panel 270. The history of detection of the changes, the control and monitoring history of the changes, etc. are transmitted to the administrator's mobile terminal 300 in real time so that the administrator can remotely control and monitor the system in real time.

For example, the items that the administrator can remotely control and monitor through the management app of the mobile terminal 300 are exemplified below.

1. Monitoring of exhaust gas concentration (sulfur oxide, nitric oxide, carbon monoxide, oxygen, etc.)
2. Monitoring of fuel injection to the marine engine
3. Monitoring of residual amount of the pretreatment desulfurization agent
4. Controlling of the injection amount of the pretreatment desulfurization agent
5. Alarm function (for example, when the exhaust gas concentration exceeds a tolerable concentration)

In addition, the present invention is not limited by the above-described embodiments. Since the same effect can be obtained even when the detailed configuration, the number of components, and arrangement of the components, those who are ordinarily skilled in the art will appreciate that various additions, deletions, and modifications to or from the embodiments are possible without departing from scope of the technical idea of the present invention.

INDUSTRIAL APPLICABILITY

The present invention can be widely used in pretreatment desulfurization control and monitoring systems.

The invention claimed is:
1. A pretreatment desulfurization control and monitoring system for a marine engine, the system comprising:
 a pretreatment desulfurization agent tank for storing a liquid-phase pretreatment desulfurization agent;
 a fuel injection amount sensor installed on a fuel supply line between a fuel tank and the marine engine and configured to detect an injection amount of fuel;
 a pretreatment desulfurization agent injection amount sensor disposed between the pretreatment desulfurization agent tank and a downstream fuel supply line installed downstream of the fuel injection amount sensor; and
 a control panel connected to the sensors in a bi-directionally communicable manner and configured to control and monitor the injection amount of the pretreatment desulfurization agent such that the pretreatment desulfurization agent is mixed with the fuel in a predetermined mixing ratio.

2. The system according to claim 1, further comprising an RPM sensor added to the marine engine and configured to detect the number of revolutions per minute (RPM) of the marine engine.

3. The system according to claim 1, further comprising a gas sensor added to an exhaust port of the marine engine and configured to detect the concentration of sulfur oxides in an exhaust gas discharged from the marine engine.

4. The system according to claim 1, further comprising a water level sensor added to the pretreatment desulfurization agent tank and configured to detect a water level.

5. The system according to claim 4, wherein a large-capacity reservoir tank for storing the pretreatment desulfurization agent for replenishment is connected to the pretreatment desulfurization agent tank, and the pretreatment desulfurization agent is automatically replenished from the reservoir tank to the pretreatment desulfurization agent tank when a water level lower than a predetermined water level is detected by the water level sensor.

6. The system according to claim 1, wherein the control panel is connected to an administrator's mobile terminal in a wirelessly communicable manner so that control and monitoring can be remotely performed through a mobile application.

7. The system according to claim 1, wherein the pretreatment desulfurization agent comprises: (a) at least one oxide selected from the group consisting of $SiO_2$, $Al_2O_3$, $Fe_2O_3$, $TiO_2$, MgO, MnO, CaO, $Na_2O$, $K_2O$, and $P_2O_3$; (b) at least one metal selected from the group consisting of Li, Cr, Co, Ni, Cu, Zn, Ga, Sr, Cd, and Pb; and (c) at least one liquid composition selected from the group consisting of sodium tetraborate ($Na_2B_4O_7$ $10H_2O$), sodium hydroxide (NaOH), sodium silicate ($Na_2SiO_3$), and hydrogen peroxide ($H_2O_2$).

8. The system according to claim 1, as the oxide comprises 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$, and 5 to 20 parts by weight of $P_2O_3$, and the metal comprises 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

9. The system according to claim 7, wherein the oxide and metal have a particle size of 1 to 2 μm and a specific gravity of 2.5 to 3.0.

10. The system according to claim 7, wherein the sodium tetraborate ($Na_2B_4O_7$ $10H_2O$) is contained in an amount of 20 to 130 parts by weight, the sodium hydroxide (NaOH) is contained in an amount of 15 to 120 parts by weight, the sodium silicate ($Na_2SiO_3$) is contained in an amount of 50 to 250 parts by weight, and the hydrogen peroxide ($H_2O_2$) is contained in an amount of 10 to 50 parts by weight.

11. The system according to claim 7, wherein in the pretreatment desulfurization agent, the oxide, the metal, and the liquid composition form a metal chelate compound.

12. The system according to claim 7, wherein an effect of adsorbing sulfur oxides ($SO_x$) by the pretreatment desulfurization agent is activated in a temperature range from 400° C. to 1200° C.

13. The system according to claim 1, wherein the pretreatment desulfurization agent is mixed in an amount of 0.1 to 10 parts by weight with respect to 100 parts by weight of marine fuel oil.

14. The system according to claim 13, wherein the pretreatment desulfurization agent is mixed in an amount of 6 parts by weight with respect to 100 parts by weight of the marine fuel oil.

15. The system according to claim 1, further comprising a line mixer disposed on the fuel supply line, wherein the pretreatment desulfurization agent is injected into marine fuel oil in a state in which the pretreatment desulfurization agent tank is connected to the line mixer.

16. The system according to claim 1, wherein the marine fuel oil is heavy oil selected from among bunker-A oil, bunker-B oil, and bunker-C oil or light oil selected from among MGO, MDO, and DDO.

* * * * *